US012786593B2

(12) United States Patent
Kimura et al.

(10) Patent No.: US 12,786,593 B2
(45) Date of Patent: Nov. 3, 2026

(54) PHOTOELECTRIC CONVERSION DEVICE, MOVABLE APPARATUS, PHOTOELECTRIC CONVERSION METHOD, AND STORAGE MEDIUM

(71) Applicant: CANON KABUSHIKI KAISHA, Tokyo (JP)

(72) Inventors: Takayuki Kimura, Kanagawa (JP); Tadanori Saito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 18/751,395

(22) Filed: Jun. 24, 2024

(65) Prior Publication Data

US 2025/0008238 A1 Jan. 2, 2025

(30) Foreign Application Priority Data

Jun. 29, 2023 (JP) ................................ 2023-106949

(51) Int. Cl.
*H04N 25/773* (2023.01)
*H04N 23/61* (2023.01)
(Continued)

(52) U.S. Cl.
CPC ........... *H04N 25/773* (2023.01); *H04N 23/61* (2023.01); *H04N 25/771* (2023.01); *H04N 25/78* (2023.01)

(58) Field of Classification Search
CPC .... H04N 25/773; H04N 23/61; H04N 25/771; H04N 25/78; H04N 25/46; H04N 25/70; H04N 25/77
See application file for complete search history.

(56) References Cited

U.S. PATENT DOCUMENTS

2019/0014281 A1* 1/2019 Kobayashi ............. H04N 7/188
2019/0191120 A1* 6/2019 Ikedo .................. H04N 25/771
(Continued)

FOREIGN PATENT DOCUMENTS

| | | | | | |
|---|---|---|---|---|---|
| EP | 2979134 | A1 | | 2/2016 | |
| JP | 2003189183 | A | * | 7/2003 | ............ H04N 23/12 |
| JP | 7223070 | B2 | | 2/2023 | |

OTHER PUBLICATIONS

European Search Report issued by the European Patent Office on Dec. 6, 2024 in corresponding EP Patent Application No. 24180704.9.

*Primary Examiner* — Nhan T Tran
(74) *Attorney, Agent, or Firm* — Carter, DeLuca & Farrell LLP

(57) ABSTRACT

A photoelectric conversion device includes: a plurality of pixels, each of which includes a sensor unit that emits pulses in accordance with photons, a counter that counts the number of the pulses, and a memory that stores a count value of the counter; and a control section that generates an image signal on the basis of a difference between count values of the counter at the time of a start and at the time of an end of an accumulation period, and the control section performs a preceding reading operation of reading the count value in a middle of a full-frame period and performs image signal reading processing such that a period of time for the preceding reading operation is shorter than a period of time for reading a main image signal configured by counter values of the plurality of pixels stored in the full-frame period.

14 Claims, 14 Drawing Sheets

(51) Int. Cl.
*H04N 25/771* (2023.01)
*H04N 25/78* (2023.01)

(56) References Cited

U.S. PATENT DOCUMENTS

| | | | | |
|---|---|---|---|---|
| 2021/0151481 | A1* | 5/2021 | Maehashi | ............ H04N 25/443 |
| 2021/0314475 | A1 | 10/2021 | Murata | |
| 2024/0402311 | A1 | 12/2024 | Kimura | |
| 2024/0406574 | A1 | 12/2024 | Saito | |
| 2024/0406598 | A1 | 12/2024 | Saito | |

* cited by examiner

FRAME 1_1 FRAME 1_5 FRAME 1_9 FRAME 1_13

PHOTOELECTRIC CONVERSION DEVICE, MOVABLE APPARATUS, PHOTOELECTRIC CONVERSION METHOD, AND STORAGE MEDIUM

BACKGROUND OF THE INVENTION

Field of the Invention

The present invention relates to a photoelectric conversion device, a movable apparatus, a photoelectric conversion method, a storage medium, and the like.

Description of the Related Art

In recent years, a photoelectric conversion device that digitally counts the number of photons that are incident on an avalanche photodiode (APD) and outputs the count value as a photoelectrically converted digital signal from a pixel has been developed. Also, Japanese Patent No. 7223070 describes a configuration of a photoelectric conversion device including an APD capable of outputting a plurality of videos, accumulation periods of which overlap each other, and taking consecutive shots even with low illuminance.

However, in a case where an imaging element for an in-vehicle camera installed in a movable apparatus, for example, is assumed, recognition processing is performed in units of video frames in ordinary sensor driving, and it is thus not possible to execute the recognition processing only at every 33.3 ms in a case of 30 fps, for example. Therefore, in a case where an object appears right after frame reading, it takes a time corresponding to about one frame (33.3 ms, for example) to start the recognition processing in the in-vehicle camera.

Since an accumulation period (exposure period) typically becomes short in a case where a one-frame period is shortened, an image captured by the camera may be an image with a poor S/N ratio, for example, and may be unsuitable for a purpose of display. It is desirable to capture images with satisfactory visibility by extending a one-frame period (accumulation period) particularly in environments with low illuminance such as during nighttime and inside a tunnel, for example. In this manner, required characteristics may differ for the purpose of recognizing objects from images and for the purpose of displaying images.

SUMMARY OF THE INVENTION

A photoelectric conversion device according to an aspect of the present invention includes: a plurality of pixels, each of which includes a sensor unit that emits pulses in accordance with photons, a counter that counts the number of the pulses, and a memory that stores a count value of the counter; one or more memories storing instructions; and one or more processors executing the instructions to: generate an image signal on the basis of a difference between count values of the counter at the time of a start and at the time of an end of an accumulation period; and perform a preceding reading operation of reading the count value in a middle of a full-frame period and perform image signal reading processing such that a period of time for the preceding reading operation is shorter than a period of time for reading a main image signal configured by counter values of the plurality of pixels stored in the full-frame period.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Figure 1:
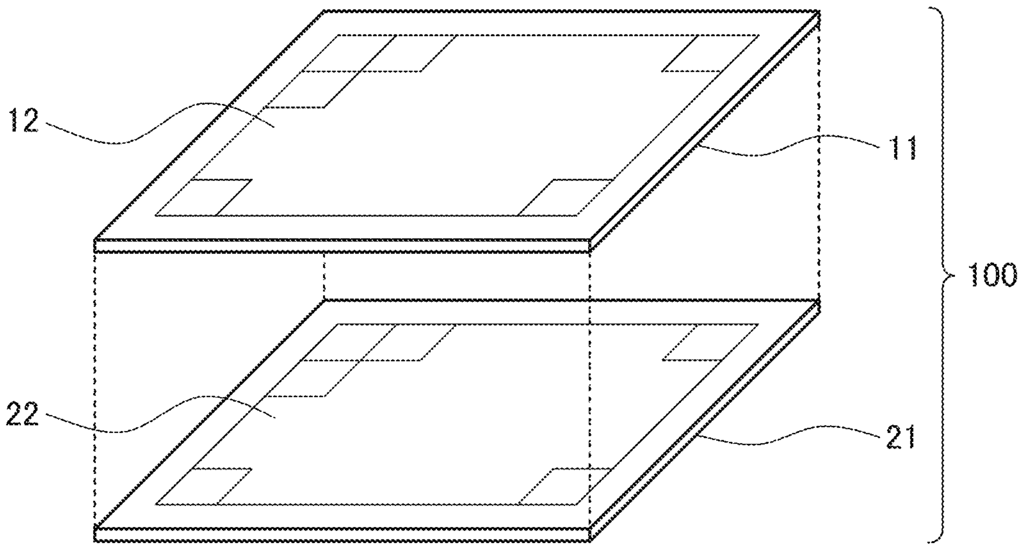
FIG. 1 is a diagram illustrating a configuration example of a photoelectric conversion element according to an embodiment of the present invention.

FIG. 1 is a diagram illustrating a configuration example of a photoelectric conversion element according to an embodiment of the present invention. Hereinafter, a photoelectric conversion device with a so-called stacked structure in which a photoelectric conversion element 100 is configured by two substrates, namely a sensor substrate 11 and a circuit substrate 21 being stacked and electrically connected to each other will be described as an example.

However, a so-called non-stacked structure in which a configuration included in the sensor substrate and a configuration included in the circuit substrate are disposed on a common semiconductor layer may be employed. The sensor substrate 11 includes a pixel region 12. The circuit substrate 21 includes a circuit region 22 in which a signal detected in the pixel region 12 is processed.

Figure 2:
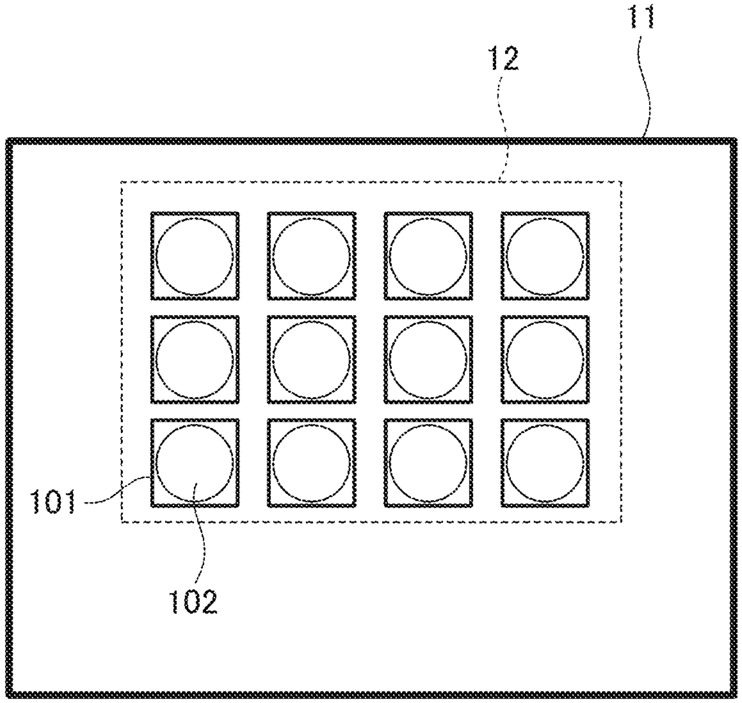
FIG. 2 is a diagram illustrating a configuration example of a sensor substrate 11.

FIG. 2 is a diagram illustrating a configuration example of the sensor substrate 11. The pixel region 12 on the sensor substrate 11 includes a plurality of pixels 101 two-dimensionally disposed in directions of a plurality of rows and columns. The pixels 101 include photoelectric conversion units 102 including avalanche photodiodes (hereinafter, APDs).

Here, the photoelectric conversion units 102 function as sensor units that emit pulses at a frequency in accordance with a photon receiving frequency. Note that although FIG. 2 illustrates an example of pixel alignment in three rows and in four columns, the numbers of rows and columns of the pixel arrays forming the pixel region 12 are not particularly limited.

Figure 3:
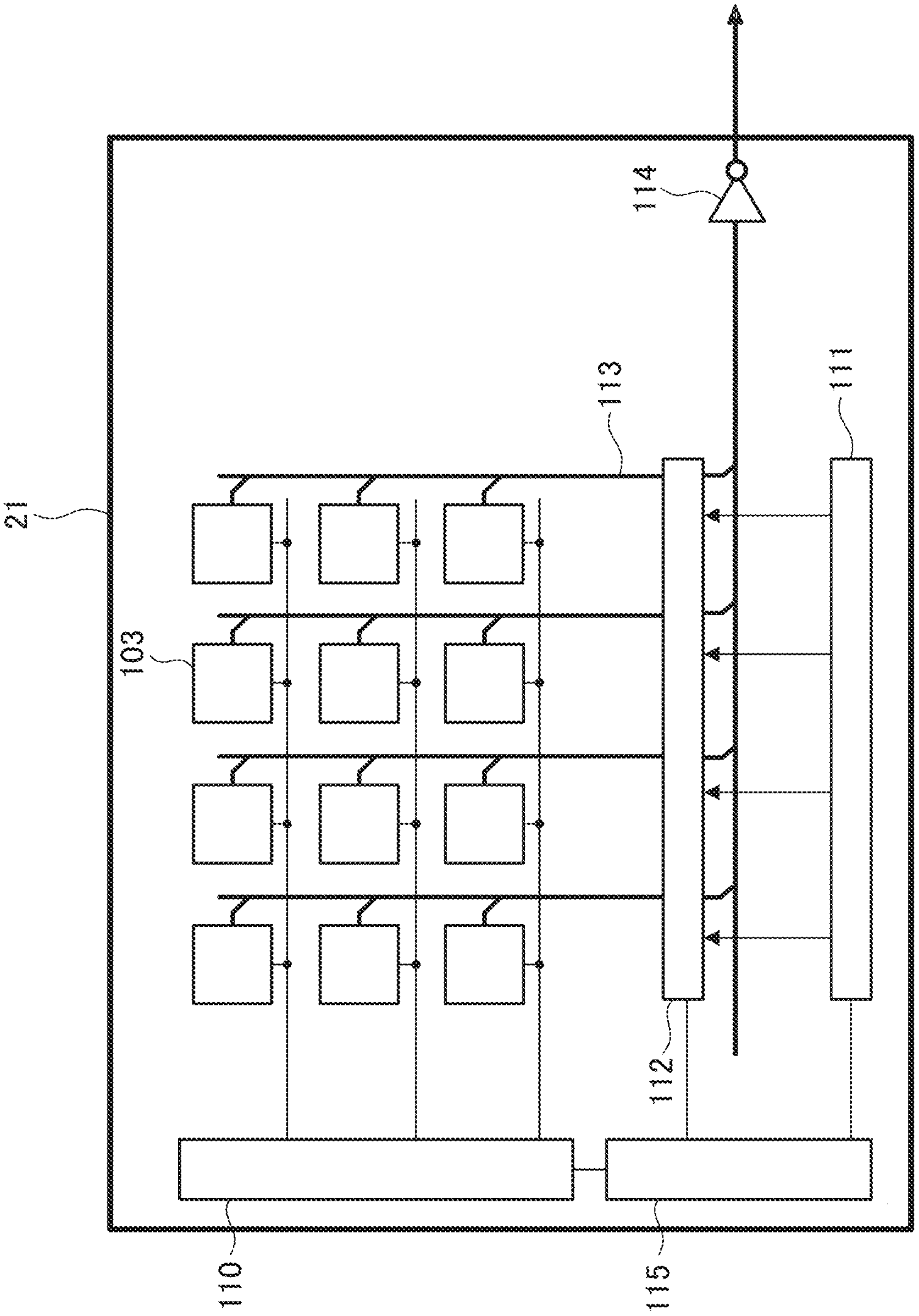
FIG. 3 is a diagram illustrating a configuration example of a circuit substrate 21.

FIG. 3 is a diagram illustrating a configuration example of the circuit substrate 21. The circuit substrate 21 includes a signal processing circuit 103 that processes charge photoelectrically converted by each photoelectrical conversion unit 102 in FIG. 2, a reading circuit 112, a control pulse generation unit 115, a horizontal scanning circuit 111, a vertical signal line 113, a vertical scanning circuit 110, and an output circuit 114.

The vertical scanning circuit 110 receives a control pulse supplied from the control pulse generation unit 115 and sequentially supplies the control pulse to the plurality of pixels aligned in the row direction. A logic circuit such as a shift register or an address decoder is used as the vertical scanning circuit 110.

A signal output from the photoelectric conversion unit 102 of each pixel is processed by each signal processing circuit 103. The signal processing circuit 103 is provided with a counter, a memory, and the like, and the memory holds digital values. The horizontal scanning circuit 111 inputs a control pulse of sequentially selecting each column to the signal processing circuit 103 in order to read the signal from the memory of each pixel holding the digital signal.

A signal is output from the signal processing circuits 103 of the pixels in the row selected by the vertical scanning circuit 110 to the vertical signal line 113. The signal output to the vertical signal line 113 is output to the outside of the photoelectric conversion element 100 via the reading circuit 112 and the output circuit 114.

A plurality of buffers connected to the vertical signal lines 113 are incorporated in the reading circuit 112. Also, the control pulse generation unit 115 can control the vertical scanning circuit 110 to perform non-addition reading of selecting all the rows.

Also, it is possible to perform control such that thinning-out reading in which rows to be read are selected from every several rows is performed in a case where the amount of data of a signal to be read is reduced. In other words, the amount of data may be reduced by performing a preceding reading operation of reading a preceding image signal in the middle of a full-frame period and thinning out and reading pixels in rows or columns when the preceding image signal is generated.

Alternatively, it is possible to perform control such that addition (average) reading of reading a plurality of adjacent pixel signals as being equivalent to one pixel signal by performing processing such as adding and averaging is performed. In other words, the amount of data may be reduced by adding count values of the plurality of pixels when the preceding image signal is generated. As for the number of pixels to be added and averaged, the numbers of pixels to be added in both the row direction and the column direction may be freely changed to, for example, 2×2 pixels or 4×4 pixels at this time.

Alternatively, control may be performed such that crop reading of selecting only a partial image region (image angle) is performed in order to reduce the amount of data of the signal to be read. In other words, the amount of data may be reduced by reading a counter value of pixels in a partial region from among the plurality of pixels when the preceding image signal is generated.

As illustrated in FIGS. 2 and 3, the plurality of signal processing circuits 103 are disposed in a region overlapping the pixel region 12 in the up-down direction. Also, the vertical scanning circuit 110, the horizontal scanning circuit 111, the reading circuit 112, the output circuit 114, and the control pulse generation unit 115 are disposed in a region overlapping a peripheral region (non-pixel region) of the pixel region 12 in the up-down direction.

Note that disposition of the vertical signal line 113 and disposition of the reading circuit 112 and the output circuit 114 are not limited to those in the example illustrated in FIG. 3. For example, the vertical signal line 113 may be disposed to extend in the row direction, and the reading circuit 112 may be disposed in front of the extension of the vertical signal line 113. Also, it is not always necessary to provide one signal processing circuit 103 for each of all the photoelectric conversion units, and a configuration in which one signal processing circuit is shared by a plurality of photoelectric conversion units and signal processing is sequentially performed may be employed.

Figure 4:
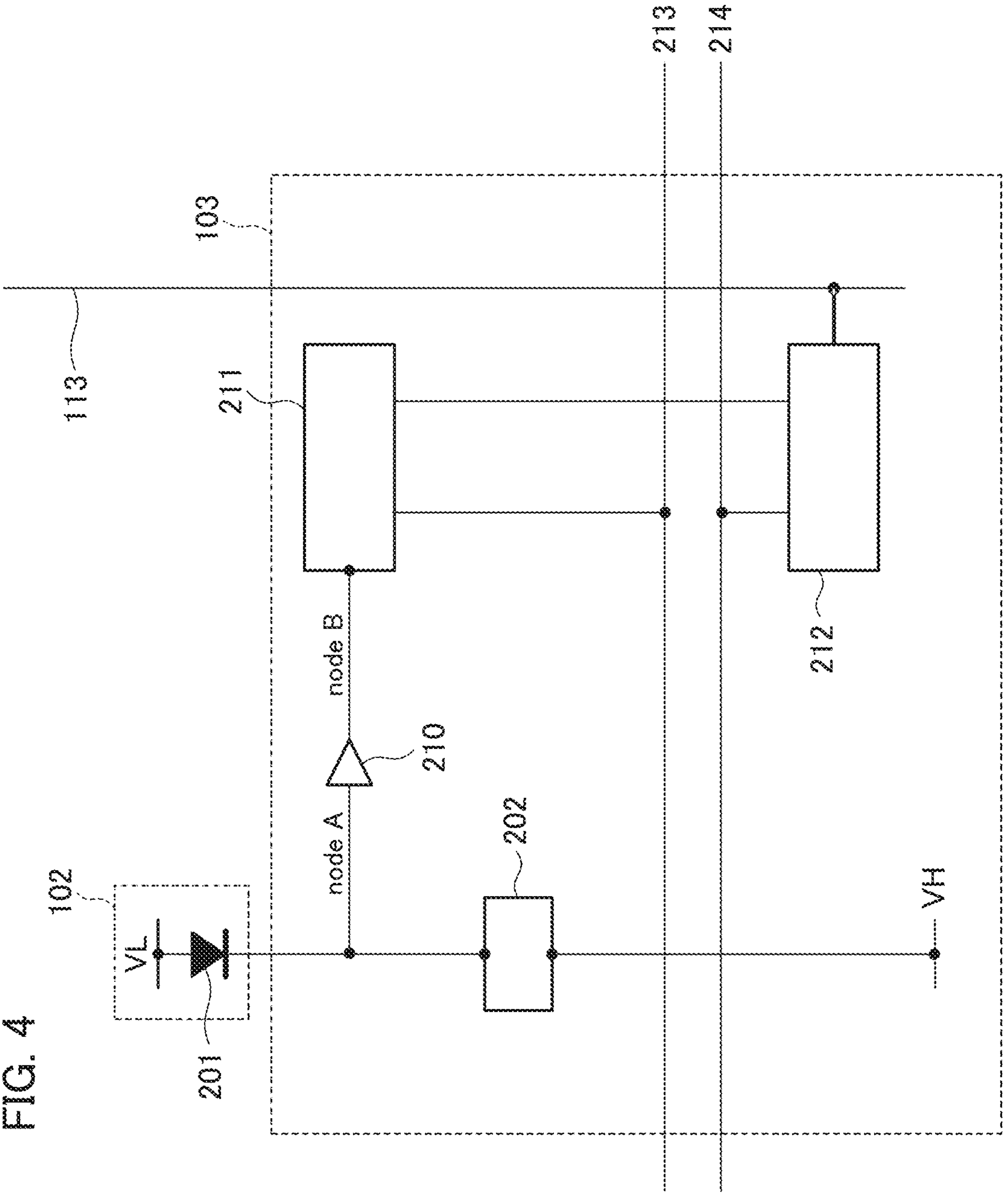
FIG. 4 is a diagram illustrating an equivalent circuit of a pixel 101 and a signal processing circuit 103 corresponding to the pixel 101 in FIGS. 2 and 3.

FIG. 4 is a diagram illustrating an equivalent circuit of the pixel 101 in FIGS. 2 and 3 and the signal processing circuit 103 corresponding to the pixel 101.

The APD 201 included in the photoelectric conversion unit 102 generates a charge pair in accordance with incident light through photoelectric conversion. One of two nodes of the APD 201 is connected to a power line to which a drive voltage VL (first voltage) is supplied. Also, the other node of the two nodes of the APD 201 is connected to a power line to which a drive voltage VH (second voltage) that is higher than the drive voltage VL is supplied.

In FIG. 4, the one of the nodes of the APD 201 is an anode, while the other node of the APD is a cathode. Reverse bias voltages to cause the APD 201 to perform an avalanche multiplication operation are supplied to the anode and the cathode of the APD 201. The charge generated by the incident light causes avalanche multiplication, and an avalanche current is generated, by achieving a state in which such voltages have been supplied.

Note that in the case where the reverse bias voltages are supplied, there are a Geiger mode in which the operation is performed with a larger voltage difference between the anode and the cathode than a breakdown voltage and a linear mode in which the operation is performed with a voltage difference between the anode and the cathode that is close to or is equal or less than the breakdown voltage. The APD that is caused to operate in the Geiger mode will be called an SPAD. In the case of the SPAD, the drive voltage VL (first voltage) is −30 V, and the drive voltage VH (second voltage) is 1 V, for example.

The signal processing circuit 103 includes a quench element 202, a waveform shaping unit 210, a counter circuit 211, and a memory circuit 212. The quench element 202 is connected to the power line to which the drive voltage VH is supplied and one node out of the anode and the cathode of the APD 201.

The quench element 202 functions as a load circuit (quench circuit) at the time of signal multiplication through avalanche multiplication and works to reduce the voltage to be supplied to the APD 201 and to reduce the avalanche multiplication (quench operation). Also, the quench element 202 works to return the voltage to be supplied to the APD 201 to the drive voltage VH by causing a current corresponding to a voltage drop through the quench operation to flow (recharge operation).

In the configuration illustrated in FIG. 4, an example in which the signal processing circuit 103 includes the waveform shaping unit 210, the counter circuit 211, and the memory circuit 212 in addition to the quench element 202 is illustrated.

The waveform shaping unit 210 shapes a change in voltage of the cathode of the APD 201 obtained at the time of photon detection and outputs a pulse signal. As the waveform shaping unit 210, an inverter circuit, for example, is used. Although FIG. 4 illustrates an example in which one inverter is used as the waveform shaping unit 210, a circuit in which a plurality of inverters are connected in series may be used, or another circuit with a waveform shaping effect may be used.

The counter circuit 211 counts the number of pulses output from the waveform shaping unit 210 and holds a count value. Also, when a control pulse RES is supplied via a drive line 213, the signal held by the counter circuit 211 is reset. Here, the counter circuit 211 generates a signal on the basis of differences between count values at the time of a start and at the time of an end of the accumulation period.

A control pulse SEL is supplied from the vertical scanning circuit 110 in FIG. 3 to the memory circuit 212 via a drive line 214 in FIG. 4 (not illustrated in FIG. 3), and electrical connection and disconnection between the counter circuit 211 and the vertical signal line 113 are switched.

The memory circuit 212 functions as a memory that temporarily stores the count value of the counter and outputs an output signal from the counter circuit 211 of the pixel to the vertical signal line 113. Note that the memory circuit 212 may be configured such that electrical connection can be established with the counter circuit inside the signal processing circuit 103 (not illustrated in FIG. 4) next to the signal processing circuit 103 illustrated in FIG. 4 and processing such as addition (averaging) can be performed.

In this manner, it is possible to perform addition (averaging) or the like on a plurality of pixel signals generated by the plurality of photoelectric conversion units, to output them as one pixel signal, and to thereby reduce the amount of data of the pixel output signal.

Alternatively, the memory circuit 212 may be able to selectively switch to a non-addition processing mode in which connection is established only to one counter circuit 211 and an addition and averaging processing mode in which connection is established with a plurality of counter circuits.

Note that switches such as transistors may be disposed between the quench element 202 and the APD 201 or between the photoelectric conversion unit 102 and the signal processing circuit 103 to thereby switch the electric connection. Similarly, supply of the drive voltage VH or the drive voltage VL to be supplied to the photoelectric conversion unit 102 may be electrically switched using a switch such as a transistor.

Figure 5:
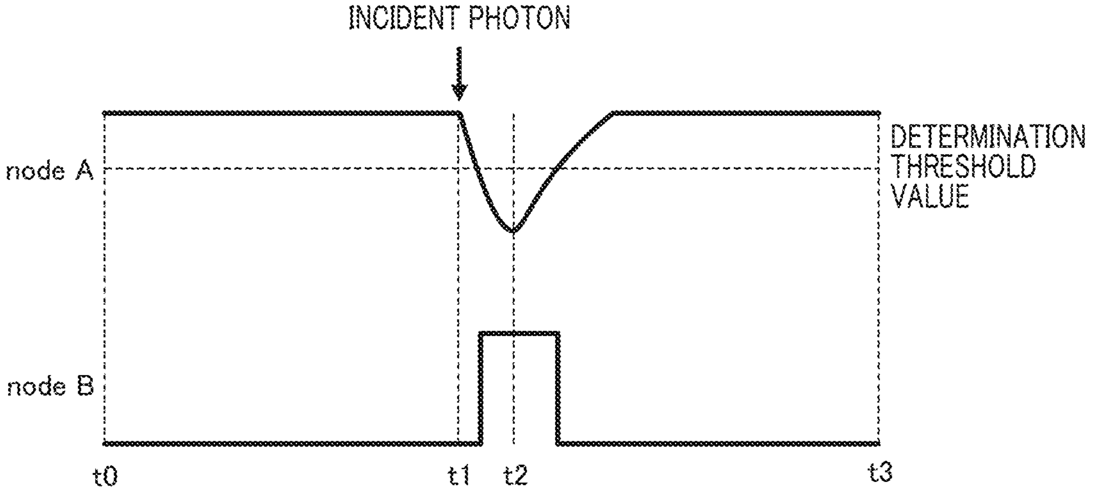
FIG. 5 is a diagram schematically illustrating a relationship between an operation of an APD 201 and an output signal.

FIG. 5 is a diagram schematically illustrating a relationship between an operation of the APD 201 and an output signal. An input side of the waveform shaping unit 210 is referred to as a node A, and an output side is referred to as a node B. A voltage difference of VH−VL is applied to the APD 201 between a clock time t0 and a clock time t1. Once photons are incident on the APD 201 at the clock time t1, avalanche multiplication occurs in the APD 201, an avalanche multiplication current flows through the quench element 202, and a voltage at the node A drops.

If the amount of voltage drop further increases, and the potential difference applied to the APD 201 decreases, then the avalanche multiplication of the APD 201 stops as shown at the clock time t2, and the voltage level at the node A does not drop below a certain specific value.

Thereafter, a current compensating for the voltage drop from the voltage VL flows through the node A from the clock time t2 to the clock time t3, and the node A settles down at the original potential level at the clock time t3. At this time, a waveform of a part of the output waveform of the node A exceeding a threshold value is shaped by the waveform shaping unit 210, and the part is thereby output as a pulse signal by the node B.

Figure 6:
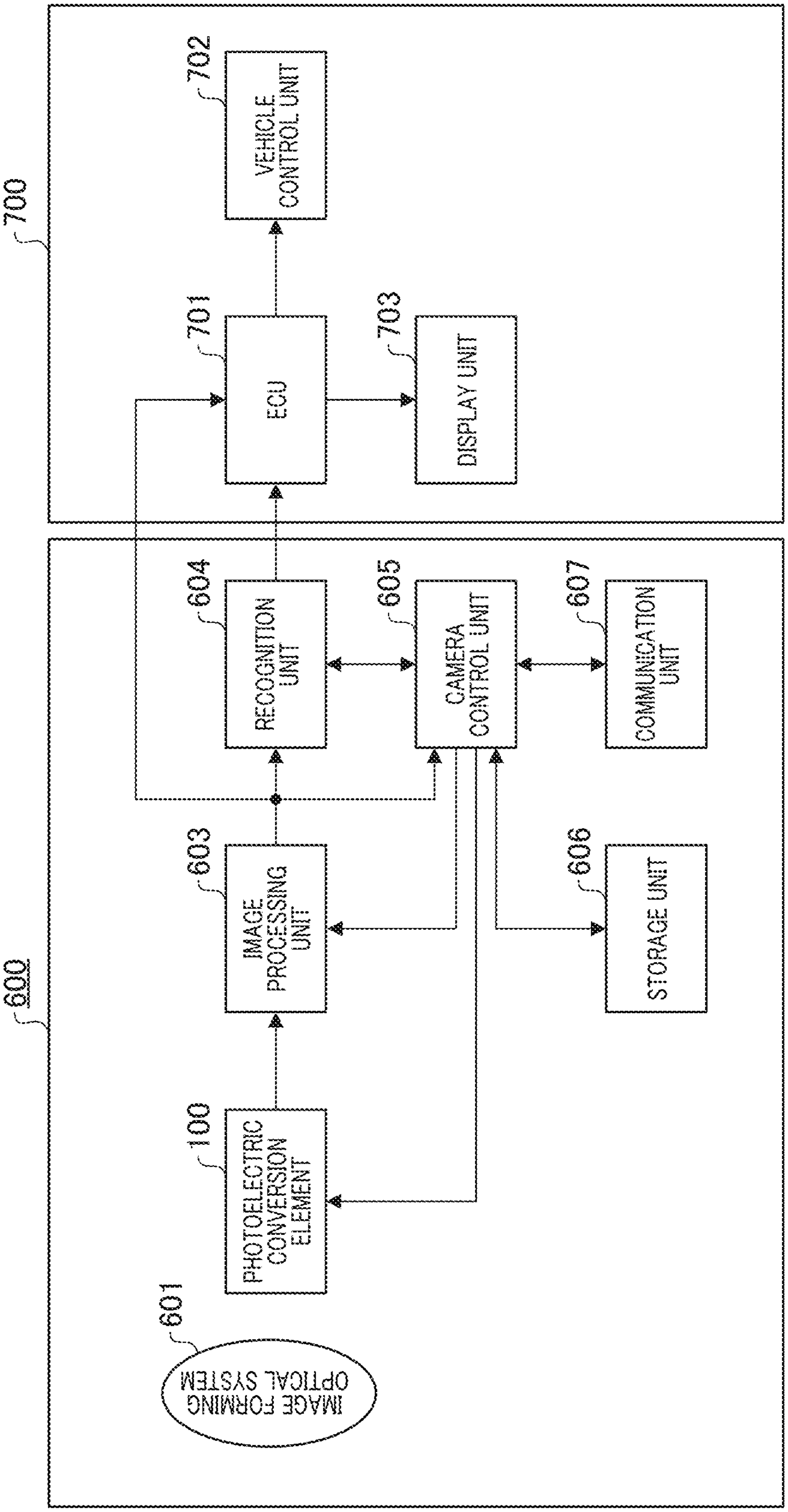
FIG. 6 is a functional block diagram of a photoelectric conversion device 600 and a movable apparatus 700 according to the embodiment.

Next, the photoelectric conversion device 600 and the movable apparatus 700 according to the embodiment will be described. FIG. 6 is a functional block diagram of the photoelectric conversion device 600 and the movable apparatus 700 according to the embodiment. Note that some of the functional blocks illustrated in FIG. 6 are realized by causing computers which are included in the photoelectric conversion device 600 and the movable apparatus 700 and are not illustrated to execute computer programs stored in memories as storage media which are not illustrated.

However, some or all of them may be realized by hardware. As the hardware, it is possible to use an application specific integrated circuit (ASIC), a processor (a reconfiguration processor or a DSP), or the like. Also, the functional blocks illustrated in FIG. 6 may not be incorporated in the same casings and may be configured by different devices connected to each other via signal paths.

The photoelectric conversion device 600 includes the photoelectric conversion element 100 explained in FIGS. 1 to 5, an image forming optical system 601, an image processing unit 603, a recognition unit 604, a camera control unit 605, a storage unit 606, a communication unit 607, and the like. The photoelectric conversion element 100 is configured of the avalanche photodiode explained in FIGS. 1 to 5 for photoelectrically converting an optical image.

The photoelectric conversion element 100 can selectively switch a plurality of reading methods, such as the non-addition reading mode, the addition (averaging) reading mode, and the thinning-out reading mode on the basis of a control signal from the camera control unit 605.

Note that the non-addition reading mode is a mode in which all the pixels are read as they are, the addition (averaging) reading mode is a mode in which adjacent pixels are added, averaged, and read, and the thinning-out reading mode is a mode in which pixels are thinned out and read.

In the present embodiment, a preceding image used for a recognition purpose is read in an addition (averaging) reading mode of 2×2 pixels, and a main image used for a visual recognition purpose is read in the non-addition reading mode. In other words, since the amount of data reading the preceding image is ¼ the amount of data of the main image, the length of the time taken to read the preceding image is also ¼. In other words, the pixel signal for the preceding image can be read at a speed of four times the speed for the main image.

The photoelectric conversion device in the embodiment is mounted in the movable apparatus 700, and a camera unit including a set of the image forming optical system 601 and the photoelectric conversion element 100 is configured to image at least one direction out of the front side, the rear side, and the lateral side of the movable apparatus, for example. Note that a plurality of camera units may be provided in the movable apparatus 700.

The image processing unit 603 performs image processing such as black level correction, gamma curve adjustment, noise reduction, digital gain adjustment, demosaicing, and data compression, for example, on an image signal acquired by the photoelectric conversion element 100 and generates a final image signal.

Note that in a case where the photoelectric conversion element 100 includes an on-chip color filter of RGB or the like, it is desirable that the image processing unit 603 perform processing such as white balance correction and color conversion. Furthermore, in a case where the read image is used for a plurality of purposes such as a visual recognition purpose, recognition purpose, and the like, it is desirable to hold image processing parameters different for each image utilization purpose in advance and switch the image processing parameters at a timing at which the image utilization purpose is switched.

An output of the image processing unit 603 is supplied to the recognition unit 604, an electric control unit (ECU) 701 of the movable apparatus 700, and a camera control unit 605. The recognition unit 604 recognizes an object by performing image recognition on the basis of the image signal. Specifically, a type of an object such as a person, an animal, a vehicle, a traffic light, or a traffic sign in the surroundings of the movable apparatus 700 is identified.

Also, reliability indicating how accurate recognition results are and coordinate information indicating the position and the size of the object in the image are also acquired together. Specifically, an offset and the size of an Z coordinate and an offset and the size of a Y coordinate are acquired as the coordinate information.

Although the three types of information, namely the type of the object, the reliability, and the coordinate information, for example, are acquired as the recognition results in the present embodiment, other information may be acquired. The recognition results acquired by the recognition unit 604 are output to the ECU 701. Note that although the present embodiment will be described using an example in which the movable apparatus 700 is an automobile, for example, the movable apparatus may be any movable apparatus such as an aircraft, a train, a ship, a drone, an AGV, or a robot as long as it can move.

The camera control unit 605 incorporates a CPU as a computer and a memory storing a computer program and controls each component of the photoelectric conversion device 600 by the CPU executing the computer program stored in the memory.

Note that the camera control unit 605 functions as a control section and controls the length of an accumulation period of each frame, a timing of a control signal CLK, and the like of the photoelectric conversion element 100 via the control pulse generation unit of the photoelectric conversion element 100, for example. Here, a one-frame period at a frame rate of a video displayed on a display unit 703, which will be described later, will be described as one full frame or a full-frame period for explanation.

Also, the camera control unit 605 transmits a control signal to switch the reading mode (reading method) when the pixel signal is read to the photoelectric conversion element 100. In the present embodiment, the two reading methods, namely the addition (averaging) reading mode and the non-addition reading mode are selectively switched within one full frame, for example.

Furthermore, the camera control unit 605 has a function of setting parameters for various kinds of image processing in the image processing unit 603 and controlling the recognition unit 604 and a function of acquiring recognition results. The storage unit 606 includes a recording medium such as a memory card or a hard disk, for example, and can store and read an image signal.

The communication unit 607 includes a wireless or wired interface, outputs a generated image signal or recognition results to outside of the photoelectric conversion device 600, and receives various signals from outside. Note that as an interface, wired communication in accordance with a standard such as SPI or I2C, for example, or a wireless LAN scheme such as Wi-Fi, Bluetooth (registered trademark), or the like may be used.

The ECU 701 incorporates a CPU as a computer and a memory storing a computer program and controls each component of the movable apparatus 700 by the CPU executing the computer program stored in the memory.

An output of the ECU 701 is supplied to the vehicle control unit 702 and the display unit 703. The vehicle control unit 702 functions as a movement control section performing driving, stopping, direction control, and the like of a vehicle as the movable apparatus on the basis of the output of the ECU 701. Here, the vehicle control unit 702 as the movement control section controls operations of the movable apparatus on the basis of a result of recognition processing using the preceding image signal.

Also, the display unit 703 functions as a display section, includes a display element such as a liquid crystal device or an organic EL, for example, and is mounted in the movable apparatus 700. The display unit 703 displays, for a driver or the like of the movable apparatus 700, an image acquired by the photoelectric conversion element 100, a recognition result acquired by the recognition unit 604, and various information related to a vehicle traveling state or the like using a GUI, for example, on the basis of the output of the ECU 701.

Note that the image processing unit 603, the recognition unit 604, and the like in FIG. 6 may not be mounted in the movable apparatus 700 and may be provided in an external terminal or the like which is provided separately from the movable apparatus 700, for example, to remotely control the movable apparatus 700 or to monitor traveling of the movable apparatus.

Figure 7:
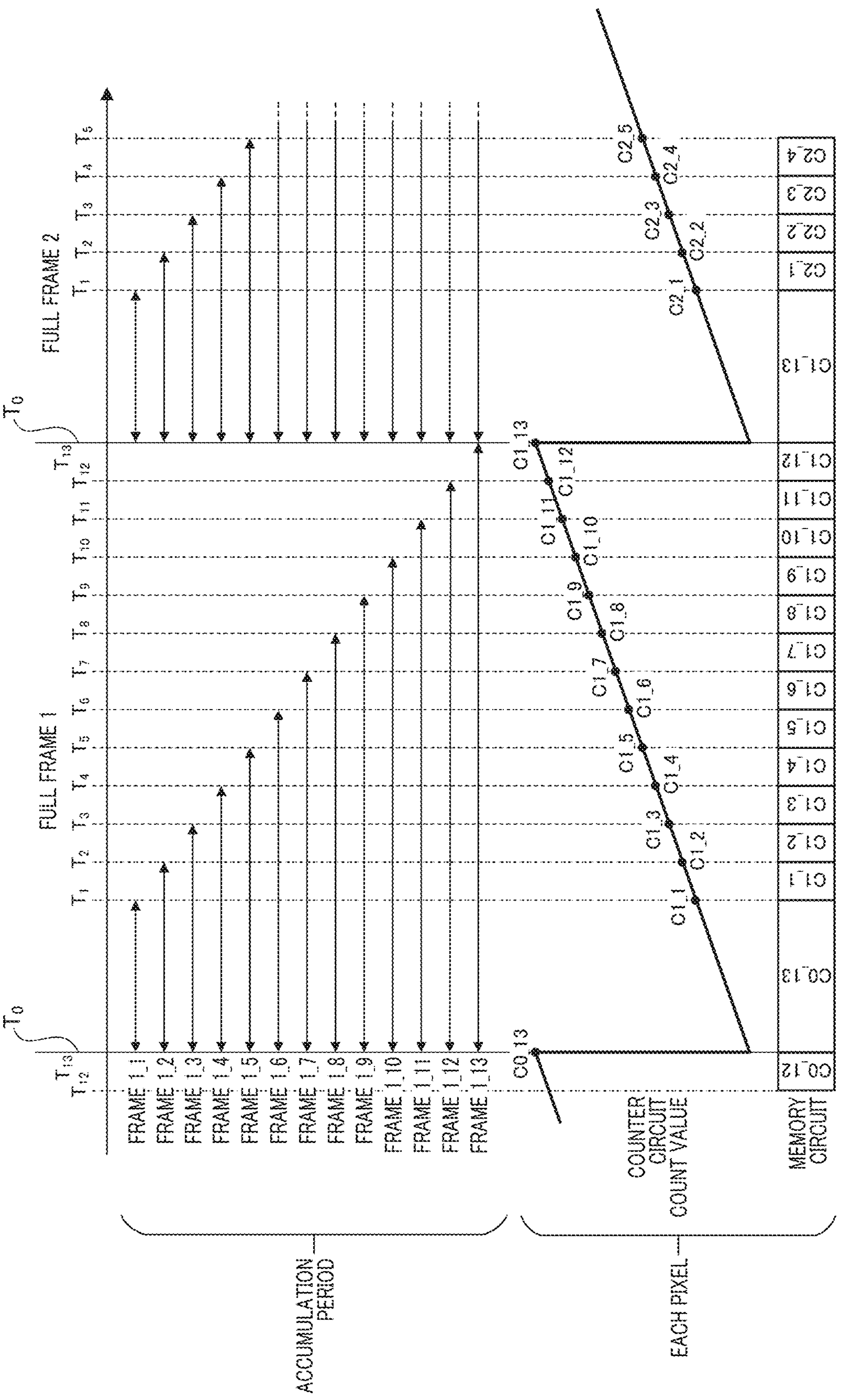
FIG. 7 is a diagram for explaining processing from photoelectric conversion to accumulation in a memory performed by a camera control unit 605 according to the embodiment.
Figure 8:
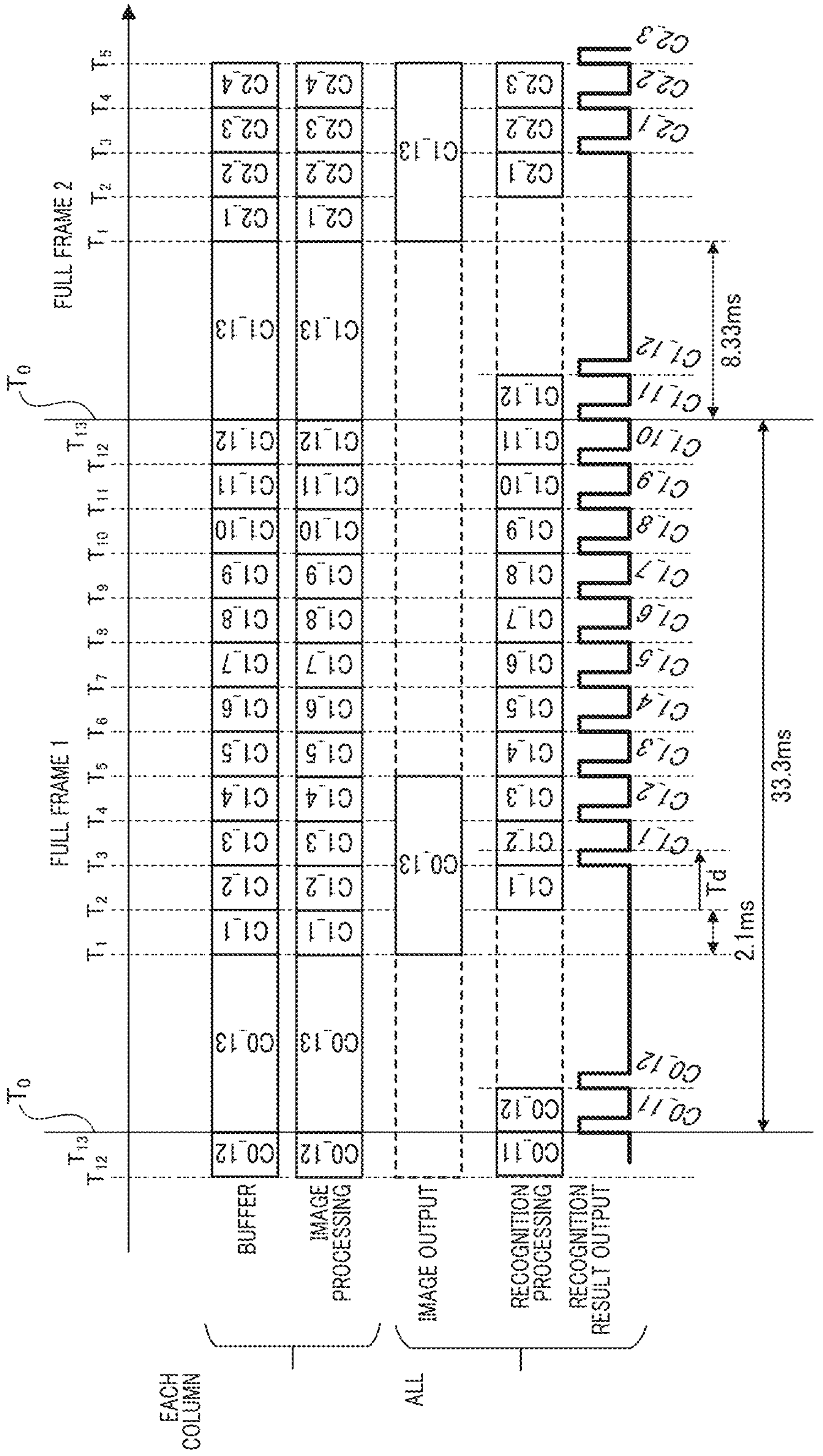
FIG. 8 is a diagram for explaining processing of image output and recognition result output performed by the camera control unit 605 according to the embodiment.

Next, the photoelectric conversion method according to the present embodiment will be described using FIGS. 7 and 8. FIG. 7 is a diagram for explaining processing from photoelectric conversion to accumulation in the memory performed by the camera control unit 605 according to the embodiment, and FIG. 8 is a diagram for explaining processing of image output and recognition result output performed by the camera control unit 605 according to the embodiment.

In the present embodiment, one full frame with a length of 33.3 ms is divided into thirteen parts. In other words, the photoelectric conversion element 100 sequentially generates twelve frames (a frame 1_1, a frame 1_2, . . . a frame 1_12) as preceding images for recognition and one full frame (frame 1_13) as a main image for visual recognition.

Here, the frame described simply as a "frame" is an expression including both the preceding image reading period and the main image reading period unlike the full frame.

Note that the twelve frames as the preceding images are read in the addition (averaging) reading mode, and the one full frame as the main image is read in the non-addition reading mode. Since the preceding image for recognition has the amount of data that is ¼ the amount of data of the main image for recognition as described above, the image reading time also has a length that is ¼. In other words, the period of time for reading the main image is 8.33 ms, the period of time for reading the preceding image is 2.08 ms, and it is thus possible to quickly complete the reading processing.

Additionally, the main image is output from the image processing unit 603 to the ECU 701, the preceding image is subjected to recognition processing performed by the recognition unit 604, and recognition results are then output from the recognition unit 604 to the ECU 701. Although the display section (display unit) displays the main image of the frame 1_13 accumulated in the longest period for visual recognition in the present embodiment, the image of the frame 1_13 may be able to be used not only for visual recognition but also for recognition.

However, since the image of the frame 1_13 is an output signal in the non-addition reading mode, and the amount of data is large, and it may take time t0 perform recognition processing, the recognition processing may be performed as needed on the image of the frame 1_13. In a case where the recognition processing is performed, and there is not enough time for the recognition processing as it is, the amount of data may be reduced through compression processing or the like using the image processing unit 603, and the recognition processing may then be performed using the reduced data.

In addition, the frame 1_1 has an accumulation period from a start clock time T0 to a clock time T1 of a frame 1, and the frame 1_2 has an accumulation period from the clock time T0 to a clock time T2. The same applies to the following frames, and the frame 1_N (N is a natural number that is equal to or less than thirteen) has an accumulation period from the clock time T0 to a clock time TN. In other words, the frames 1_1 to 1_13 have first to thirteenth accumulation periods, respectively.

First, a processing flow of the frame 1_1 (preceding image) used for a recognition purpose will be described. The counter circuit 211 is reset at the clock time T0, and a count value C1_1 is acquired in the addition (averaging) reading mode at the clock time T1.

In a case where the pixel 101 is a monochrome pixel, the count value C1_1 calculated through adding and averaging processing on the count values of four pixels that are adjacent to the counter circuit 211 is temporarily saved in the memory circuit 212.

In a case where the pixel 101 is a color filter with a Bayer layout of R, Gr, Gb, and B, for example, the count value C1_1 is calculated by adding and averaging the count values of the pixels that are the closest in the same colors. The count value C1_1 temporarily saved in the memory circuit 212 is then output from the photoelectric conversion element to the image processing unit 603 via the buffers of the reading circuit 112 as illustrated in FIG. 8.

The image processing unit 603 performs the aforementioned various kinds of image processing and outputs processing results as they are to the recognition unit 604. As illustrated in FIG. 8, the image of the frame 1_1 is output to the recognition unit 604 in the period from the clock time T1 to the clock time T2, and outputs of image signals corresponding to all lines are completed at the timing of the clock time T2.

Also, object recognition processing is started by the recognition unit 604 at the timing of the clock time T2. Note that although the example in which the recognition processing is started at the timing of the clock time T2 at which all image signals of the frame 1_1 are prepared has been described in the present embodiment, the recognition processing may be sequentially performed for each line or each pixel.

It is possible to shorten the time required to acquire the recognition results by reducing the processing unit for recognition as described above. The recognition results are quickly output to the ECU 701 at the same time with the completion of the recognition processing. In the present embodiment, the shortest time required for the recognition processing and outputs of the results will be referred to as Td as illustrated in FIG. 8.

At this time, outputs of the recognition results based on the image of the frame 1_1 can be transmitted to the ECU 701 of the movable apparatus 700 at the timing of the clock time T2+Td in the fastest case. The processing flow for the frame 1_1 has been described hitherto.

Hereinafter, the preceding images of the frame 1_2, the frame 1_3, . . . , the frame 1_12 are also sequentially read in the periods from the clock time T2 to the clock time T3, from the clock time T3 to the clock time T4, . . . , from the clock time T12 to the clock time T13 similarly to the frame 1_1. Then, recognition processing is sequentially performed at the timing of the clock time T3, the clock time T4, . . . , the clock time T13, and recognition results are sequentially output from the recognition unit 604 to the ECU 701 at the timing of the clock time T3+Td, the clock time T4+Td, . . . , the clock time T13+Td, respectively.

Subsequently, a processing flow of the frame 1_13 (main image) used for a visual recognition purpose will be described. A count value C1_13 is read and acquired from the counter circuit 211 in the non-addition mode at the clock time T0 of the full frame 2.

The acquired count value C1_13 is temporarily saved in the memory circuit 212. The count value C1_13 temporarily saved in the memory circuit 212 is output from the photoelectric conversion element to the image processing unit 603 via the buffers of the reading circuit 112.

The image processing unit 603 performs the aforementioned various kinds of image processing and outputs processing results as they are to the recognition unit 604. The image of the frame 1_13 is quickly output to the ECU 701 in the movable apparatus 700 in the period from the clock time T1 to the clock time T5 of the full frame 2, and outputs of image signals corresponding to all the lines are completed at the timing of the clock time T5 as illustrated in FIG. 8.

Although the recognition processing using the recognition unit 604 is not performed in consideration of the large amount of data of the image signals in the frame 1_13 in the present embodiment, the recognition processing may be performed as needed. The image signals of the frame 1_13 have high contrast, low noise, and reduced LED flickering and are used for visual recognition with the highest priority.

However, it is possible to shorten the time required to recognize an object at the time of switching of the full frame by performing the recognition processing in parallel. In other words, although C1_12 to C2_1 is a blank period in which no recognition results are obtained in the "recognition result output" at the bottom of FIG. 8, it is possible to shorten the above blank period by performing recognition processing of the image of C1_13 as well. The processing flow for the frame 1_13 has been described hitherto.

Figure 9:
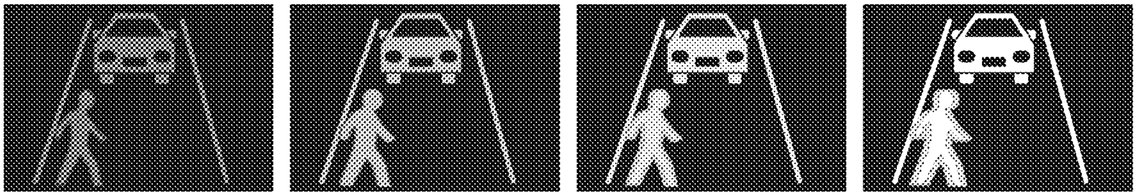
FIG. 9 is a diagram illustrating an example of images of a plurality of divided frames.

FIG. 9 is a diagram illustrating an example of images of a plurality of divided frames. FIG. 9 illustrates four frames of three preceding images of the frame 1_1, the frame 1_5, and the frame 1_9 and of the main image of the frame 1_13 out of the total of thirteen images acquired within one full frame (33.3 ms).

Although the image of the frame 1_1 is dark due to the short accumulation period as illustrated in FIG. 9, object blur of a person who has jumped out is small. On the other hand, since the accumulation periods increases in the order of the frame 1_5, 1_9, and 1_13, object blur is more likely occur. Note that blur of a stopping vehicle and a white line is unlikely to occur, and contrast is more likely to be improved as the accumulation period increases.

In this manner, the first to thirteenth reading timings (T1 to T13) are included in the one full-frame period in the present embodiment. The camera control unit 605 performs control such that the first to twelfth reading timings (T1 to T12) occur earlier than the thirteenth reading timing (T13).

Also, control is performed such that the periods of time t0 read (periods of time required to read) the first to twelfth image signals as the preceding image signals are shorter than the period of time t0 read the thirteenth image signal as the main image signal.

In other words, a preceding reading operation of reading the count value is performed in the idle of the full-frame period, and the period for the preceding reading operation is set to be shorter than the period to read the main image signal configured by the counter values of the plurality of pixels stored in the full-frame period. Also, other image signals are further read between the preceding reading operation (the reading operation at T1, for example) and the main image signal reading operation (the reading operation at T13).

In addition, the first to twelfth accumulation periods overlap the thirteenth accumulation period, and the first to twelfth accumulation periods and the thirteenth accumulation period start at the same time in the present embodiment. Furthermore, the thirteenth accumulation period ends at the timing at which the full frame ends.

In other words, images with short accumulation periods and an image with a long accumulation period are created, the timing at which the short accumulation periods ends are set to be earlier than the timing at which the long accumulation period ends, and the images are output and sent to the recognition unit in the following stage as soon as the short accumulation periods end. Also, the object is recognized at least on the basis of a signal generated in the first accumulation period. The recognition unit 604 as the recognition section recognizes the object at least on the basis of the preceding image signal generated in the first accumulation period.

Therefore, it is possible to perform image recognition right after the period of time t0 read the thirteenth image elapses in the shortest case in the present embodiment, while it is not possible to perform image recognition before one full frame elapses in the related art. In other words, it is possible to quickly recognize an obstacle or the like when the movable apparatus moves at a high speed. Furthermore, it is possible to quickly step on the brake by outputting the recognition results to the ECU 701 with a small delay. Alternatively, it is possible to avoid an obstacle in an early stage.

Note that it is possible to improve contrast of the image with the long accumulation period and to thereby use it as an image for display. In other words, the images with the short accumulation periods are suitable for quick object recognition, and the image with the long accumulation period is suitable for an image for display. In this manner, the display device in the present embodiment displays at least a signal generated in the thirteenth accumulation period as an image.

Also, since the APD is used in the present embodiment, the charge accumulated through reading is not degraded unlike a CMOS sensor, and it is thus possible to cause the accumulation periods to overlap each other. Also, the original signal is not degraded regardless of the number of times the signal is read in one-time accumulation because there is no reading noise.

Figure 10:
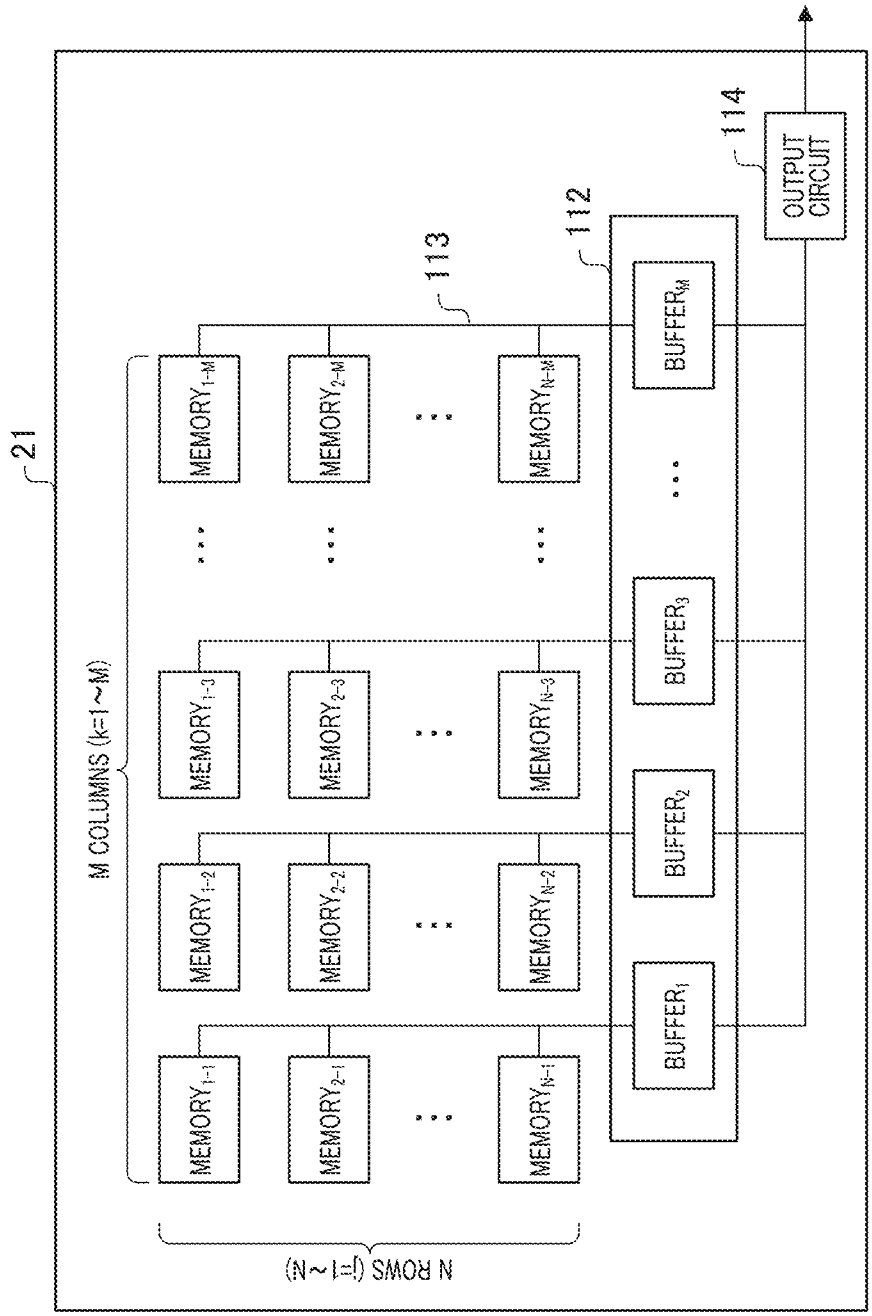
FIG. 10 is a diagram illustrating a relationship between memory circuits and buffers according to the embodiment.

FIG. 10 is a diagram illustrating a relationship between the memory circuits and the buffers in the embodiment. FIG. 10 illustrates a state in which the memory circuits 212 in the signal processing circuit 103 in FIG. 3 are aligned in N rows and M columns, and the respective memory circuits are represented as a memory 1-1 to a memory N-M.

Also, a buffer 1 to a buffer M in FIG. 10 represent the buffers included in the reading circuit 112 in FIG. 3. The output circuit 114 in FIG. 10 corresponds to the output circuit 114 in FIG. 3.

Figure 11:
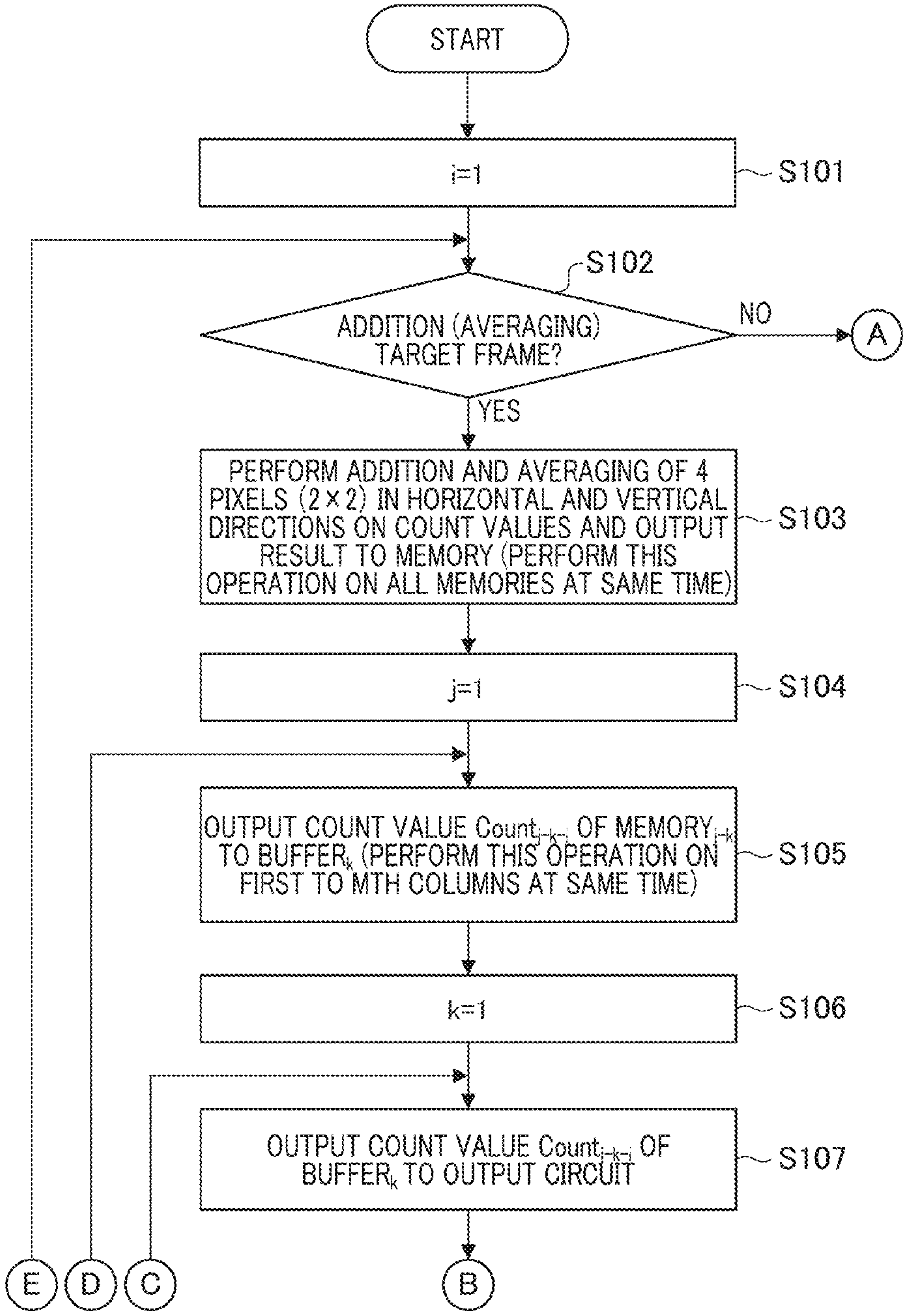
FIG. 11 is a flowchart illustrating a part of an example of driving of the photoelectric conversion element according to the embodiment.
Figure 12:
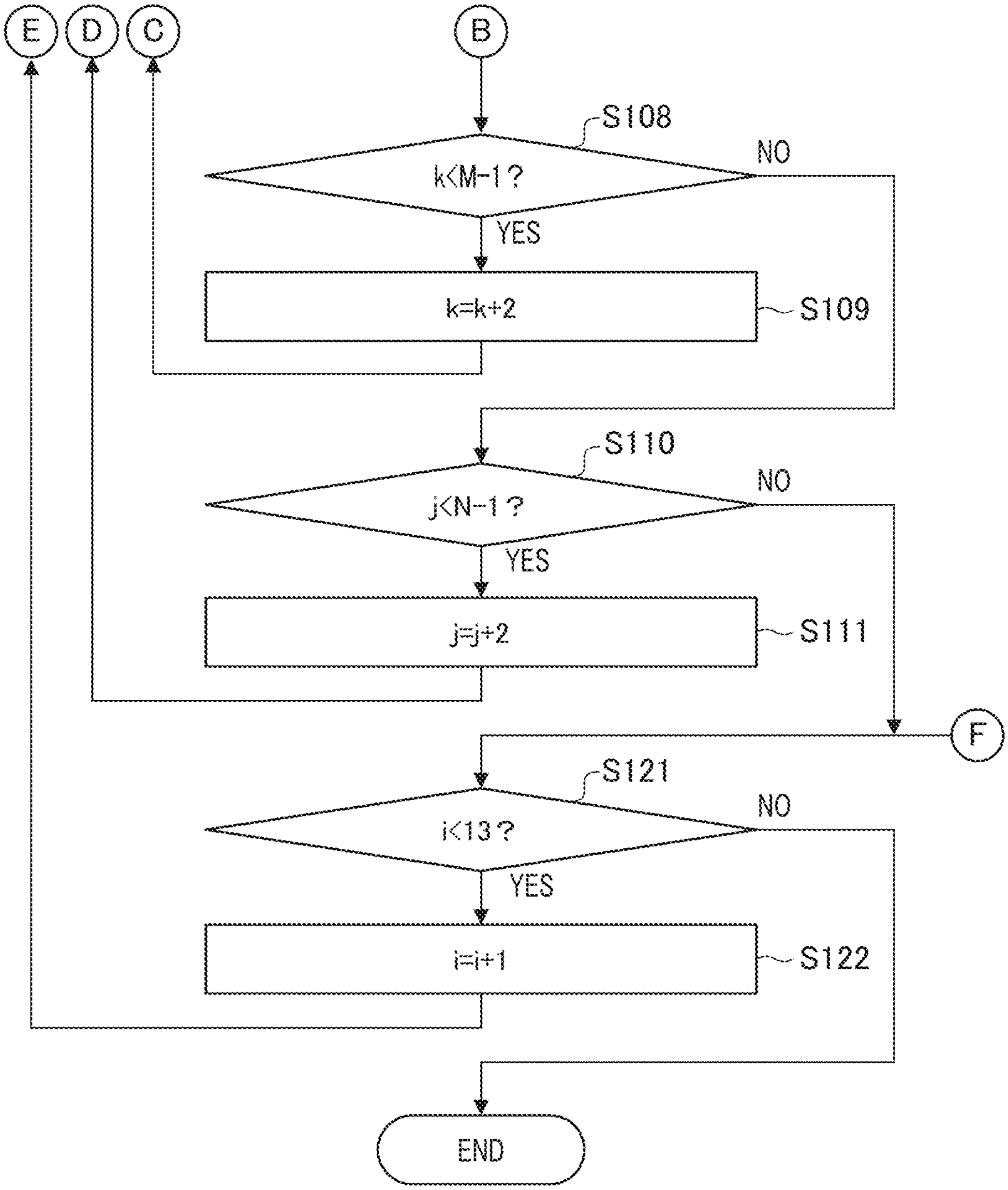
FIG. 12 is a flowchart continuing from FIG. 11.
Figure 13:
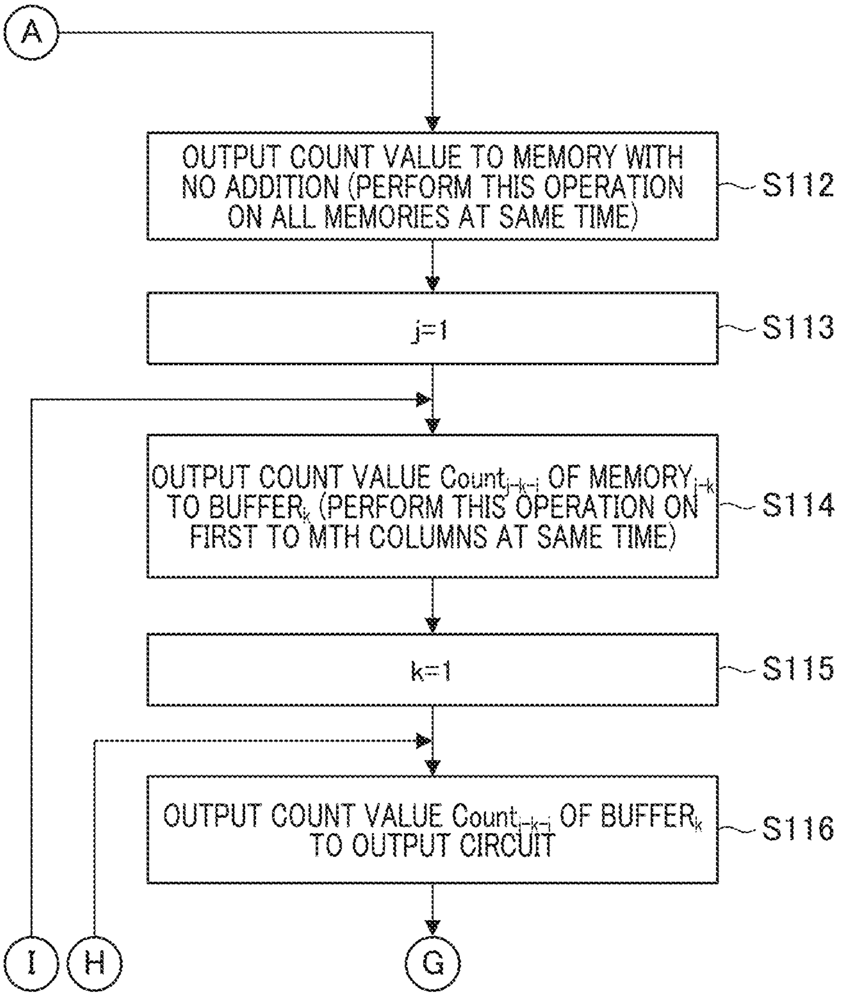
FIG. 13 is another flowchart continuing from FIG. 11.
Figure 14:
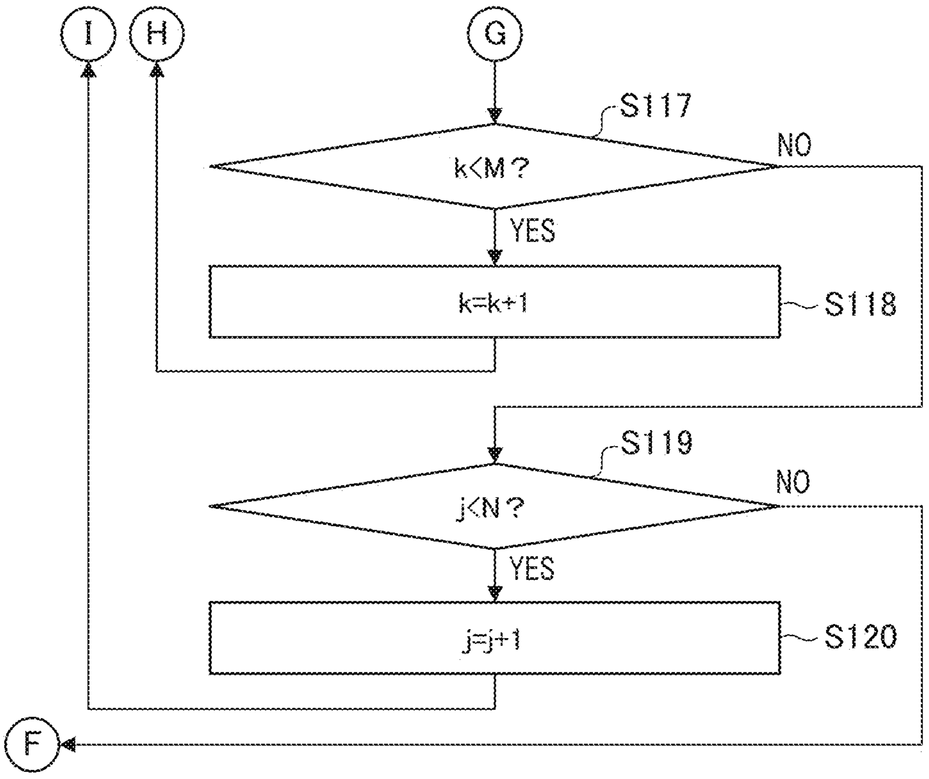
FIG. 14 is a flowchart continuing from FIG. 13.

FIG. 11 is a flowchart illustrating a part of an example of driving of the photoelectric conversion element according to the embodiment FIG. 12 is a flowchart continuing from FIG. 11, FIG. 13 is another flowchart continuing from FIG. 11, and FIG. 14 is a flowchart continuing from FIG. 13. In other words, the example of driving of the photoelectric conversion element according to the embodiment is illustrated as a whole by the flowcharts in FIGS. 11 to 14.

Note that the operation in each step in the flowcharts in FIGS. 11 to 14 is sequentially performed by the CPU as the computer in the camera control unit 605 executing the computer program stored in the memory.

The CPU in the camera control unit 605 sets i=1 in Step S101 in FIG. 11. Here, i corresponds to a frame 1_*i*. Next, in Step S102, the CPU in the camera control unit 605 determines whether the current frame is a frame on which addition processing is to be performed when a count value is output to the memory, that is, a frame for recognition processing.

In the present embodiment, determination of Yes is made when i=1 to 12, and determination of No is made when i=13. The determination in Step S102 may be made by setting an ID indicating an addition (averaging) reading mode, a non-addition reading mode, or the like for each frame in advance and checking the ID, or may be made by checking a count value while counting the number of frames.

In a case where it is desired to selectively change frames for addition (averaging) reading and non-addition reading in one full frame using the ID, it is possible to perform the processing using the same algorithm merely by reassigning the ID of each frame. The processing proceeds to Step S103 when the determination result in Step S102 is Yes, or the processing proceeds to Step S112 in FIG. 13 via A if the determination result is No.

Next, the CPU in the camera control unit 605 outputs, to the memory circuit 212, a result obtained by performing adding and averaging of a total of four pixels, namely two pixels both in the horizontal direction and in the vertical direction on a count value Count of the counter circuit 211 at a clock time Ti in Step S103. Since monochrome pixels 101 are assumed in the present embodiment, the adding and averaging result of the four pixels is output only to the memory circuits 212 in the N rows and the M columns where both N and M are odd numbers.

In other words, count values are not present for the memory circuits 212 in the N rows and the M columns where at least any one of N and M is an even number. In a case of a color filter with a Bayer layout of R, Gr, Gb, and B instead of the monochrome, for example, one count value is present for four pixels both in the horizontal direction and in the vertical direction for each of the colors. Also, the count values are output to all the memory circuits at the same time when they are output to the memory circuit 212. The operation corresponds to the operation at the clock time T1 in FIG. 7.

Next, the CPU in the camera control unit 605 sets j=1 in Step S104, and the CPU in the camera control unit 605 outputs a count value Count (j−k−i) of a memory circuit j−k in FIG. 10 to the buffers in Step S105. At this time, the 1 to M columns provide the outputs to the buffers at the same time. However, since count values are present only in the odd-number columns, the number of data items of the count value Count (j–k–i) actually output to the buffers is M/2.

In other words, the count values of the even-number columns may not be output to the buffers. This operation means an operation of taking the count value of the first row in FIG. 10 in the buffers.

Next, the CPU in the camera control unit 605 sets k=1 in Step S106, and the CPU in the camera control unit 605 outputs a count value Count (j–k–i) of a buffer k to the output unit 114 in Step S107. This operation corresponds to an operation of reading a signal of the buffer of the leftmost column in FIG. 10 from the output circuit.

Next, the CPU in the camera control unit 605 determines whether k<M−1 is established in Step S108 in FIG. 12. In a case of Yes, the CPU in the camera control unit 605 adds two to k as k=k+2 in Step S109 and returns to Step S107 to perform the operation in Step S107.

The reason that one is not added to k is because the count values are not present in the even-number columns as described above. This operation corresponds to an operation of reading a signal of the buffer of the third column from the left in FIG. 10 from the output circuit.

In a case where the result in Step S108 is No, that is, in a case where k=M−1 or k=M is established, this means that the reading of the signal of the M−1-th column or M-th column in FIG. 10 from the output circuit has ended. Next, the processing proceeds to Step S110, and the CPU in the camera control unit 605 determines whether j<N−1 is established.

In a case where the result in Step S110 is Yes, the CPU in the camera control unit 605 adds two to j as j=j+2 in Step S111 and returns to Step S105. This corresponds to an operation for starting reading of the next row.

In a case where determination of No is made in Step S110, this means that reading of all the rows has ended, the processing thus proceeds to Step S121, and the CPU in the camera control unit 605 determines whether or not i<13 is established. In a case where determination of Yes is made in Step S121, the processing proceeds to Step S122, and the CPU in the camera control unit 605 increases one to i as i=i+1 and returns to Step S102. The operation corresponds to an operation of starting the next reading at the clock time T2.

In the present embodiment, the processing of making determination of Yes in Step S102 is repeated twelve times. In other words, the flow in Steps S103 to S121 is repeated twelve times. This operation corresponds to an operation of performing reading at the clock time T1 to the clock time T12. Thereafter, the processing returns to Step S102 in a state where i=13 is achieved in Step S122. The CPU in the camera control unit 605 makes determination of No in Step S102 and moves on to Step S112 in FIG. 13.

Next, in Step S112, the CPU in the camera control unit 605 outputs the count value Count of the counter circuit 211 at the clock time Ti as it is (without performing adding and averaging processing) to the memory circuit 212. At this time, outputs are provided to all the memory circuits at the same time. This operation corresponds to the operation at the clock time T13 in FIG. 7.

Next, the CPU in the camera control unit 605 sets j=1 in Step S113, and the CPU in the camera control unit 605 outputs the count value Count (j–k–i) of the memory circuit j–k in FIG. 10 to the buffers in Step S114.

At this time, outputs are provided to the buffers of the first to M-th columns at the same time. Step S114 is different from Step S105, count values are present in both the even-number columns and odd-number columns, and the number of data items is M. This operation means an operation of taking the count value of the first row in FIG. 10 in the buffers.

Next, the CPU in the camera control unit 605 sets k=1 in Step S115, and the CPU in the camera control unit 605 outputs the count value Count (j–k–i) of the buffer k to the output circuit 114 in Step S116. This operation corresponds to an operation of reading a signal of the buffer of the leftmost column in FIG. 10 from the output circuit.

Next, the CPU in the camera control unit 605 determines whether k<M is established in Step S117 in FIG. 14. Then, if the result is No, the CPU in the camera control unit 605 adds one to k as k=k+1 in Step S118 and returns to Step S116 to perform the operation in Step S116.

The reason that one is added to k in Step S116 while two is added to k in Step S109 is because the count values are present in both the even-number columns and the odd-number columns as described above. This operation corresponds to an operation of reading the signal of the buffer of the second column from the left in FIG. 10 from the output circuit.

In a case where the result in Step S117 is No, that is, in a case where k=M is established, this means that reading of the signal of the buffer of the M-th column in FIG. 10 from the output circuit has ended, the processing proceeds to Step S119 next, and the CPU in the camera control unit 605 determines whether j<N is established.

In a case where determination of Yes is made in Step S119, the CPU in the camera control unit 605 adds one to j as j=j+1 in Step S120 and returns to Step S114. This corresponds to an operation of starting reading of the next row.

In a case where determination of No is made in Step S119, this means that reading of all the rows has ended, the processing thus proceeds to Step S121, and the CPU in the camera control unit 605 determines whether or not i<13 is established. Since the thirteenth frame is brought into a state where i=13, and determination of No is made in Step S121.

In a case where determination of No is made in Step S121, this means that reading at the clock time T13 has been completed, and this thus means that reading of all image signals accumulated in the first full frame has been completed. As described above, it is possible to sequentially read the signals accumulated in the photoelectric conversion element 100.

Note that the example in which adding and averaging of 4 pixels, namely 2 pixels in the horizontal direction and 2 pixels in the vertical direction are performed on the preceding images for recognition has been described in the above embodiment, for example, the number of pixels to be added and averaged may be arbitrarily set both in the horizontal direction and in the vertical direction.

Also, the same applies to a case where thinning-out reading is performed, and the number of pixels to be thinned out and the number of rows (thinning-out rate) may be arbitrarily set. Although the example of the monochrome pixels 101 has been described in the present embodiment, a color filter of a Bayer layout of R, Gr, Gb, B, or the like may be provided and processing such as adding and averaging, thinning-out, and the like may be performed for pixels of the same colors when the adding and averaging processing and the thinning-out processing are performed.

Alternatively, the recognition unit 604 may perform object recognition based on a preceding image signal, calculates recognition accuracy on the basis of the result, and determine the number of pixels to be added and averaged in the pixel addition (averaging) reading mode and the thinning-out rate in the thinning-out reading mode in accordance with the recognition accuracy.

In other words, in a case where the recognition unit 604 can output the recognition result with high accuracy regardless of a low resolution of an acquired image, the number of pixels to be added and the thinning-out rate are increased to reduce the amount of image data. It is thus possible to realize an increase in speed.

Also, which method out of the addition (averaging) reading mode and the thinning-out reading mode is to be used may be determined in accordance with brightness of ambient light. In other words, the reduction rate of the amount of data may be controlled on the basis of the brightness of the ambient light.

In a case where the ambient light is equal to or greater than a predetermined value, for example, a sense of noise is not significantly degraded even if the amount of signal is reduced, and the amount of data is thus reduced by choosing the thinning-out reading mode in which reading processing is simply performed, that is, the mode in which pixels in rows or columns are thinned out. On the other hand, in a case where the ambient light is less than the predetermined value, the amount of data may be reduced by choosing the addition (averaging) reading mode in order to improve a sense of noise and adding (averaging) the count values of the plurality of pixels.

As described above, images (hereinafter, preceding images) read in a state in the middle of accumulation are acquired and subjected to recognition processing in addition to the image (hereinafter, main image) acquired in units of a full frame (33.3 ms) in the present embodiment. It is thus possible to reduce the period of time from full-frame switching to recognition.

Also, since the accumulation periods of the preceding images are shorter than that of the main image, and the preceding images have relatively small object blur, the recognition rate can be improved even for an object that is not able to be recognized only from the main image. Furthermore, the period of time required from the full-frame switching to the recognition can be further shortened by increasing the frequency at which the preceding images are acquired.

Also, the photoelectric conversion device is mounted in the movable apparatus and is used for the visual recognition purpose for displaying a surrounding environment as an image for the driver using the display section such as an electronic mirror and for object recognition for avoiding obstacles and stepping on brake in automatic driving, driving assistance, or the like in the present embodiment. At that time, it is possible to obtain high image quality such as high contrast and low noise because the main image is used as the image for visual recognition.

On the other hand, since the resolution is reduced and the amount of data of the image is reduced in order to realize an increase in processing speed for the preceding images for recognition, it is possible to perform transmission with a small delay. Furthermore, since the resolution of the image is optimized in accordance with the object recognition accuracy, it is possible to achieve a resolution sufficient to recognize the object and the smallest amount of data.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the photoelectric conversion device and the like through a network or various storage media. Then, a computer (or a CPU, an MPU, or the like) of the photoelectric conversion device and the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-106949, filed on Jun. 29, 2023, which is hereby incorporated by reference herein in its entirety.

What is claimed is:

1. A photoelectric conversion device comprising:

a plurality of pixels, each of which includes
- a sensor unit that emits pulses in accordance with photons,
- a counter that counts the number of pulses, and
- a memory that stores a count value of the counter;

one or more memories storing instructions; and one or more processors executing the instructions to:
- generate an image signal on the basis of a difference between count values of the counter at the time of a start and at the time of an end of an accumulation period;
- perform a preceding reading operation of reading a count value for generating a preceding image signal before an end of a full-frame period, wherein the preceding reading operation precedes a reading operation of reading a count value at the end of the full-frame period, and perform image signal reading processing, wherein a period of time for the preceding reading operation is shorter than a period of time for reading a main image signal configured by counter values of the plurality of pixels stored in the full-frame period;
- perform recognition processing for recognizing an object on the basis of the preceding image signal before the end of the full-frame period; and
- display the main image signal for visual recognition.

2. The photoelectric conversion device according to claim 1, wherein other image signals are read between the preceding reading operation and a reading operation of the main image signal.

3. The photoelectric conversion device according to claim 1, wherein an amount of data of the preceding image signal is reduced when the preceding image signal is generated.

4. The photoelectric conversion device according to claim 3, wherein the amount of data is reduced by adding count values of the plurality of pixels when the preceding image signal is generated.

5. The photoelectric conversion device according to claim 3, wherein the amount of data is reduced by thinning out and reading pixels in rows or columns when the preceding image signal is generated.

6. The photoelectric conversion device according to claim 3, wherein the amount of data is reduced by reading counter values of pixels in a partial region from among the plurality of pixels when the preceding image signal is generated.

7. The photoelectric conversion device according to claim 3, wherein a reduction rate of the amount of data is determined on the basis of an accuracy of object recognition based on the preceding image signal.

8. The photoelectric conversion device according to claim 3, wherein a reduction rate of the amount of data is controlled on the basis of a brightness of ambient light.

9. The photoelectric conversion device according to claim 8, wherein the amount of data is reduced by thinning out and reading pixels in rows or columns in a case where an amount of ambient light is equal to or greater than a predetermined value and reduces the amount of data by adding count values of the plurality of pixels in a case where an amount of ambient light is less than the predetermined value.

10. The photoelectric conversion device according to claim 1, wherein the sensor unit includes an avalanche photodiode.

11. A photoelectric conversion device comprising:
a plurality of pixels, each of which includes:
a sensor unit that emits pulses in accordance with photons,
a counter that counts the number of pulses, and
a memory that stores a count value of the counter;
one or more memories storing instructions; and
one or more processors executing the instructions to:
generate an image signal on the basis of a difference between count values of the counter at the time of a start and at the time of an end of an accumulation period;
perform a preceding reading operation of reading a count value for generating a preceding image signal before an end of a full-frame period, wherein the preceding reading operation precedes a reading operation of reading a count value at the end of the full-frame period, and perform image signal reading processing, wherein a period of time for the preceding reading operation is shorter than a period of time for reading a main image signal configured by counter values of the plurality of pixels stored in the full-frame period;
perform recognition processing for recognizing an object on the basis of the preceding image signal before the end of the full-frame period; and
display the main image signal for visual recognition.

12. A movable apparatus comprising:
a plurality of pixels, each of which includes:
a sensor unit that emits pulses in accordance with photons,
a counter that counts the number of pulses, and
a memory that stores a count value of the counter;
one or more memories storing instructions; and
one or more processors executing the instructions to:
generate an image signal on the basis of a difference between count values of the counter at the time of a start and at the time of an end of an accumulation period;
perform a preceding reading operation of reading a count value for generating a preceding image signal before an end of a full-frame period, wherein the preceding reading operation precedes a reading operation of reading a count value at the end of the full-frame period, and perform image signal reading processing, wherein a period of time for the preceding reading operation is shorter than a period of time for reading a main image signal configured by counter values of the plurality of pixels stored in the full-frame period;
perform recognition processing for recognizing an object on the basis of the preceding image signal before the end of the full-frame period;
display the main image signal for visual recognition; and
control operations of the movable apparatus on the basis of a result of the recognition processing using the preceding image signal.

13. A photoelectric conversion method for performing photoelectric conversion by a plurality of pixels, each of which includes a sensor unit that emits pulses in accordance with photons, a counter that counts the number of pulses, and a memory that stores a count value of the counter, the method comprising:
generating an image signal on the basis of a difference between count values of the counter at the time of a start and at the time of an end of an accumulation period;
performing a preceding reading operation of reading a count value for generating a preceding image signal before an end of a full-frame period, wherein the preceding reading operation precedes a reading operation of reading a count value at the end of the full-frame period, and perform image signal reading processing, wherein a period of time for the preceding reading operation is shorter than a period of time for reading a main image signal configured by counter values of the plurality of pixels stored in the full-frame period;
performing recognition processing for recognizing an object on the basis of the preceding image signal before the end of the full-frame period; and
displaying the main image signal for visual recognition.

14. A non-transitory computer-readable storage medium configured to store a computer program to control a photoelectric conversion device configured to have:
photoelectric conversion performed by a plurality of pixels, each of which includes a sensor unit that emits pulses in accordance with photons, a counter that counts the number of pulses, and a memory that stores a count value of the counter;
wherein the computer program comprises instructions for executing following processes:
generating an image signal on the basis of a difference between count values of the counter at the time of a start and at the time of an end of an accumulation period;
performing a preceding reading operation of reading a count value for generating a preceding image signal before an end of a full-frame period, wherein the preceding reading operation precedes a reading operation of reading a count value at the end of the full-frame period, and perform image signal reading processing, wherein a period of time for the preceding reading operation is shorter than a period of time for reading a main image signal configured by counter values of the plurality of pixels stored in the full-frame period;
performing recognition processing for recognizing an object on the basis of the preceding image signal before the end of the full-frame period; and
displaying the main image signal for visual recognition.

* * * * *